US00RE36503E

United States Patent [19]

Rubley et al.

[11] E Patent Number: Re. 36,503

[45] Reissued Date of Patent: Jan. 18, 2000

[54] TRANSMISSIVE/REFLECTIVE OPTICAL SCANNING APPARATUS

[75] Inventors: John S. Rubley, Redondo Beach; Loi Han, Alhambra, both of Calif.

[73] Assignee: Microtek International, Inc., Redendo Beach, Calif.

[21] Appl. No.: 09/189,921

[22] Filed: Nov. 11, 1998

Related U.S. Patent Documents

Reissue of:

[64] Patent No.: 5,574,274
Issued: Nov. 12, 1996
Appl. No.: 08/393,112
Filed: Feb. 21, 1995

[51] Int. Cl.[7] ..... H04N 1/04

[52] U.S. Cl. ..... 250/208.1; 250/234; 358/474

[58] Field of Search ..... 250/208.1, 234, 250/235; 358/474, 487, 493, 494, 505, 506, 508, 513

[56] References Cited

U.S. PATENT DOCUMENTS

| | | | |
|---|---|---|---|
| 4,656,525 | 4/1987 | Norris | 358/487 |
| 4,829,184 | 5/1989 | Nelson et al. | 250/358.1 |
| 4,879,604 | 11/1989 | Koshiyouji | 358/474 |
| 4,989,099 | 1/1991 | Koshiyouji et al. | 358/487 |
| 5,140,443 | 8/1992 | Iwahara et al. | 358/474 |
| 5,282,081 | 1/1994 | Chen et al. | 358/474 |
| 5,333,066 | 7/1994 | Sugata | 250/208.1 |
| 5,341,192 | 8/1994 | Wally, Jr. et al. | 355/50 |
| 5,457,547 | 10/1995 | Yamada | 358/474 |
| 5,574,274 | 11/1996 | Rubley et al. | 250/208.1 |

*Primary Examiner*—Stephone Allen
*Attorney, Agent, or Firm*—Small Larkin, LLP

[57] ABSTRACT

An optical scanning apparatus for retrieving digital electronic images representative of opaque and transmissive objects. The apparatus is equipped with a reflective scanning platform for scanning documents and photographs and a docking port for receiving a transmissive scanning platform for scanning transparencies and slides. A scanning camera equipped with light sources for illuminating the respective platforms may be aligned by the operator to retrieve images from either the reflective scanning platform or from the transmissive scanning platform. An optical switch which is included within the optical pathway selectively toggles the view of the scanning camera between the reflective platform and the transparent platform. An operator using a control panel button or software can selectively scan either type of object. The choice of two scanning platforms optimizes the digital image quality for each type of media.

25 Claims, 6 Drawing Sheets

FIG. 1
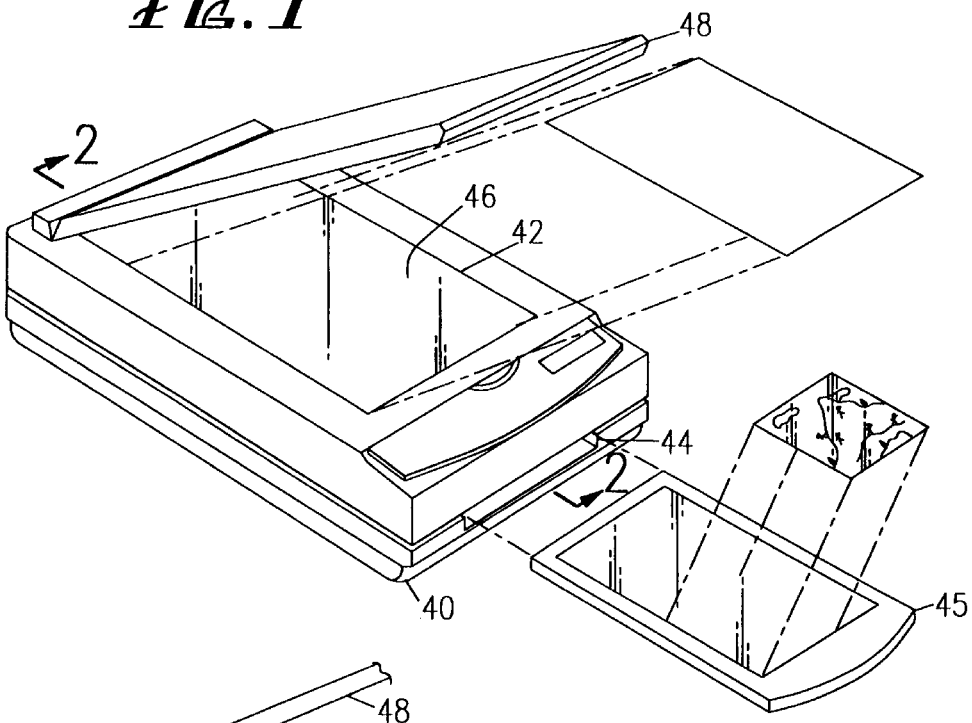
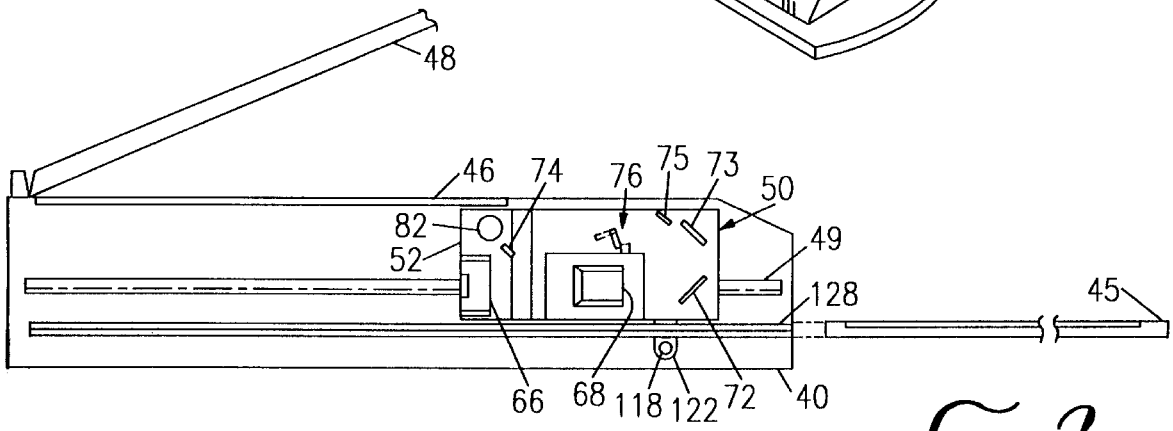
FIG. 2

TRANSMISSIVE/REFLECTIVE OPTICAL SCANNING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an optical scanning apparatus and more particularly to a transmissive and reflective optical scanning apparatus.

2. Description of the Related Art

Recent developments in the use of high speed, low cost digital electronic imaging systems to process, transmit and display digital information have substantially increased the demand for optical scanners to convert information into a digital electronic form. A variety of optical scanners, including facsimile machines and digital copiers, have been developed to meet this growing demand. The optical scanners generally fall within two categories, reflective scanners for opaque objects, such as documents and photographs, and transmissive scanners for transparent objects, such as slides and transparencies. Reflective scanners, used with opaque objects, project light onto the side of the object to be scanned. The object illuminated by the reflected light is then viewed by a digital camera which converts the image into a digital electronic form. Transmissive scanners, used with transparent objects, project light through the object to be scanned. The transmissive object is also viewed by a digital camera to then be stored in a digital electronic form. The growing demand for both reflective and transmissive scanners has resulted in a need for scanners to provide both capabilities.

Present dual scanner designs, as illustrated in FIG. 7, utilize a conventional reflective base scanner 20. This type of scanner includes a digital camera and a reflective light source (not shown) mounted on rails and driven by a motor within the base housing to scan along the length of the document. The light source projects light upon the portion of the object within the field of view of the camera. Documents and photographs are placed on a glass platen 22. The light source and camera move incrementally lengthwise across a document under the glass platen to scan in an image line by line. This conventional reflective scanner design has been modified with the addition of a second light source 24 for transmissive objects. This light is preferably housed behind a second glass platen 26 within a lid 28 which overlies the base 20. The light source 24 is movably mounted on a pair of rails and wired electronically to the reflective scanner base to provide light through a portion of a transmissive object within the field of view of the camera. The transmissive light source mechanism includes a motor 28 to maintain the light directly within the camera's field of view by incrementally moving along the rails in the lid in synchronous movement with the camera.

In order to obtain the best picture quality from the design presently used.,the light source located in the lid must be maintained in synchronous alignment with the camera at all times during scanning. The electronic communication between the lid light source and the scanner base is necessary to maintain synchronous movement. Thus in addition to a second drive mechanism such a scanner requires additional electronic circuitry in both the scanner and the scanner lid to maintain the light 24 in alignment with the camera. This adds additional cost to the manufacture of the device.

Furthermore, the glass platen 22 located on the scanner base 20 must include physical properties to eliminate distortion from the reflective light source below the base glass platen as well as the transmissive light source within the lid. This problem is unique to the dual transmissive and reflective scanner, because ordinary transmissive scanners do not include a glass plate in between the image and the scanner; rather they are designed to position the object to be scanned directly within the field of view of the camera to improve the image quality. The improved image quality is important to transmissive scanners, because there is a great demand for high resolution graphics reproduction.

As described above, the conventional transmissive and reflective scanners are unable to provide an unobstructed path for the transmissive scanning of objects. They also require more moving parts and increased electronic circuiting which leads to a higher manufacturing cost. Thus, the need exists for a transmissive and reflective scanner which is low in cost easy to manufacture and provides an unobstructed pathway for developing high quality transmissive images as well as including a reflective scanning capability.

OBJECTS AND SUMMARY OF THE INVENTION

It is an object of the present invention to provide an optical scanning apparatus for the transmissive and reflective scanning of images.

It is an additional object of the present invention to provide an optical scanning apparatus for the transmissive and reflective scanning of images using a single scanning camera.

It is another object of the present invention to provide a reflective scanning platform adapted for the reflective scanning of images and a transmissive scanning platform adapted for the transmissive scanning of images each of said platforms being within the field of view of the scanning camera.

It is a further object of the present invention to provide an optical pathway between the scanning camera and the transmissive and/or reflective platforms. The optical pathway further includes a transmissive branch, a reflective branch and an optical switch for selectively directing light from the reflective platform or the transmissive platform towards the scanning camera.

It is yet another object of the present invention to toggle the optical switch between a reflective mode and transmissive mode in response to an electronic signal generated by a scanner controller circuit.

In accordance with the objects of the present invention, a conventional scanner housing is provided with a scanning camera comprising a Charged Coupled Device (CCD) and a fixed focus lens. A conventional transmissive platform and a conventional reflective platform are both included within the scanner housing. The scanning camera also includes reflective and transmissive light sources respectively positioned to direct light upon an object located on the corresponding platform. An optical pathway places objects to be scanned within the field of view of the scanning camera. The optical pathway includes a transmissive branch segment and a reflective branch segment. An optical switch is positioned at the fork between the two segments and is electronically operated by a controller circuit including a Central Processing Unit (CPU) within the scanner to direct light from either the transmissive pathway or the reflective pathway into the field of view of the camera. In this manner the scanning camera can be used to scan reflective or transmissive images from the respective platforms.

The reflective scanning platform is conventional in design and includes a glass platen located on the upper surface of the housing. The scanning camera and reflective light source are located on rails underneath the glass platen and incrementally move along the rails to scan the object line by line. A lid, attached by a hinge to the rear end of the glass platen, maybe rotatably positioned to overlie the glass platen to block out ambient light. A document or photograph maybe placed in between the lid and the glass platen. The optical switch is toggled to align the reflective branch segment with the field of view of the camera. Light from the reflective light source located on the scanning camera is projected through the glass platen onto a portion of the document or photograph within the field of view of the camera. A digital representation of this portion of the image is then stored by the scanner. The scanning camera then moves lengthwise across the glass platen to the next portion to be scanned and repeats the process until the entire reflective scanning platform has been The transmissive scanning platform, located beneath the scanning camera, may also be scanned in a similar manner. The optical switch is toggled to align the transmissive branch segment within the field of view of the scanning camera. Once aligned, a slide or a transparency on the transmissive scanning platform maybe scanned in the same manner as the reflective object.

The optical switch is a mirror which may be selectively positioned within the field of view of the scanning camera to redirect the view of the scanning camera between the reflective scanning platform and the transmissive scanning platform. By positioning the mirror to change the location of objects viewed by the scanning camera, two separately designed scanning platforms may be used by the same scanning camera. The optical switch provides for the scanning of reflective and transmissive objects using separate scanning platforms, each of which is tailored to achieve the optimal scanning environment for the respective types of images. The optical switch and optical pathway achieves this dual scanning capability with a minimal number of additional parts. Other features and advantages of this invention will be made apparent upon review of the drawings and detailed description of the invention.

BRIEF DESCRIPTION OF THE DRAWINGS

The objects and advantages of the present invention will become more readily apparent to those ordinarily skilled in the art after viewing the following detailed description and accompanying drawings wherein:

FIG. 1 is a perspective view of the optical scanner of the present invention;

FIG. 2 is a cut-away side view of the optical scanner of FIG. 1 taken along line 2—2 showing a scanning camera;

DETAILED DESCRIPTION

Figure 7:
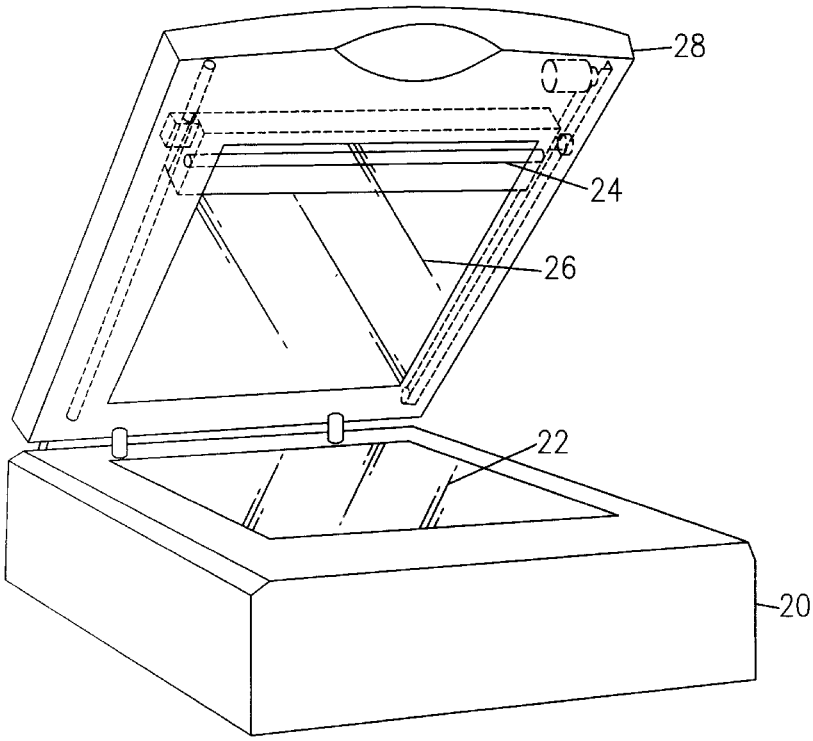
FIG. 7 PRIOR ART
FIG. 7 is a perspective view of a conventional optical scanner.
Figure 3:
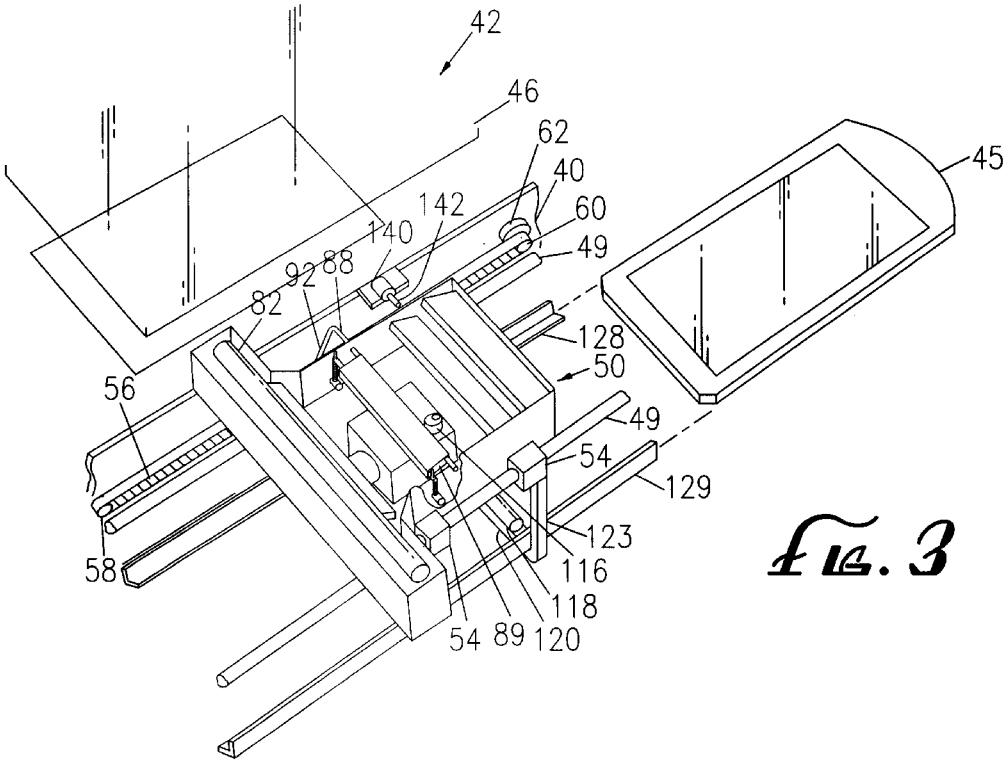
FIG. 3 is an exploded, partial perspective view of the scanning camera of FIG. 2.
Figure 4:
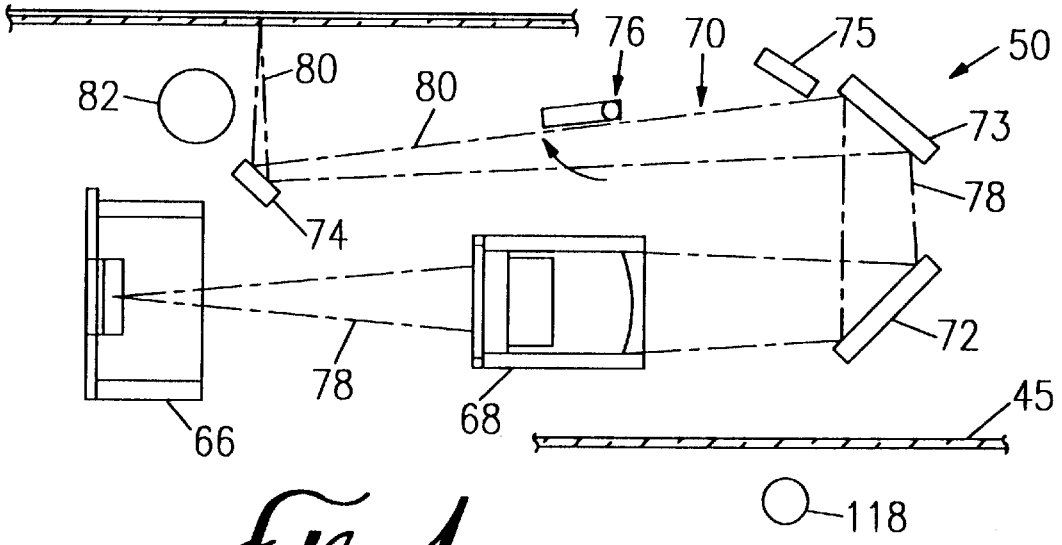
FIG. 4 is a diagrammatic side view of the scanning camera of the present invention showing the optical scanning of an opaque object.
Figure 5:
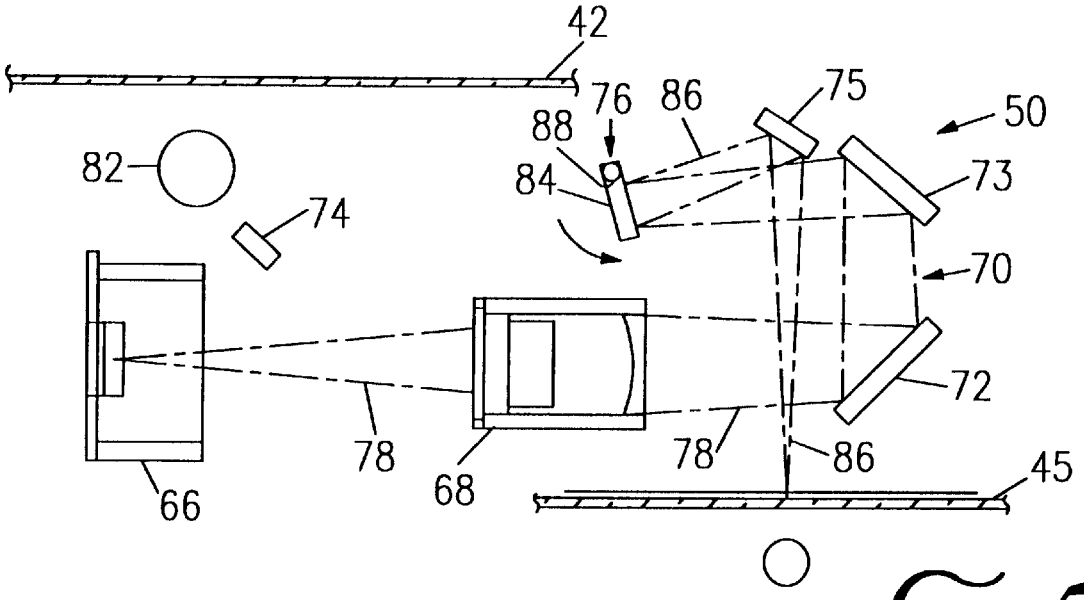
FIG. 5 is a diagrammatic side view of the scanning camera of the present invention showing the optical scanning of a transparent object.

With reference to the figures for purposes of illustration, the present invention is generally a transmissive and reflective optical scanner as illustrated in FIG. 1. The scanner includes generally a rectangular housing 40 with a reflective scanning platform 42 and a docking port 44 to secure a transmissive scanning platform 45. Located on the back side of the housing, the scanner includes plugs for connecting the scanner to a power source and a standard interface port to connect with a personal computer (not shown). Used in a conventional manner, the personal computer receives digital [dam] *data* representative of the image scanned by the optical scanner.

The reflective scanning platform 42 consists of a rectangular glass platen 46 secured in an aperture within the upper surface of the housing. A lid 48, attached by a hinge to the rear end of the housing may be rotatably positioned to overlie the glass platen 46 to block out ambient light. The reflective scanning platform as described is conventional in design.

Underlying the reflective scanning platform and secured to rails 49 running lengthwise along an interior cavity within the housing is a scanning camera 50. The scanning camera 50 includes a camera chassis 52 which includes a plurality of collars 54 movably coupled to the rails 49. An endless belt 56 extends lengthwise alongside the rails 49 and connects at opposite ends of the mils to a free moving pulley 58 and a pulley 60 connected to the drive shaft of a conventional stepper motor 62. The chassis 52 is conventionally secured to the endless belt 56 by clamps. The stepper motor 62, electrically connected to a controller circuit 64, is responsive to the controller circuit 64 to bi-directionally rotate the belt 56 and thus incrementally position the chassis 52 at any point along the rails. A CCD 66, the preferred type of opto-electric transducer which is mounted at the lower rear end of the chassis 52 with a field of view projecting toward the front of the chassis, is aligned with a centrally located fixed-focus lens 68. The CCD 66, connected in electrical circuit with the controller circuit 64, is responsive to send electrical signals representative of the images viewed by the CCD to the controller circuit 64.

The field of view of the CCD 66, extending through the lens towards the front of the chassis, is aligned with an optical pathway 70 defined by a plurality of precisely aligned mirrors 72–75 and an optical switch 76. The mirrors 72–75 are mounted onto the chassis conventionally with rubber mounts (not shown) to protect the mirrors during movement of the scanner. The mirrors, designed conventionally for use in optical instruments, include a reflective surface on the side confronting the reflected light to minimize any distortion that would occur if light is reflected through the glass to a reflective surface on the backside. The optical pathway functions as a periscope with the mirrors configured to provide remote viewing of an image by the CCD. The main portion 78 of the optical pathway receives light shifted into an upper horizontal portion 79 of the chassis. The light is reflected through two parallel mirrors 72≅73. A top mirror 73 reflects light downward towards a bottom mirror 72 that restores the light to a horizontal direction through the lens to the CCD or digital camera. For reflective scanning, light enters the upper horizontal portion of the chassis from a reflective branch segment 80 of the optical pathway. The reflective branch segment 80 includes an upper tubular florescent lamp 82 that is mounted on the upper side of the chassis to project light at an acute angle up through a portion of the glass platen 46 included in the reflective scanning platform. A reflective scanning mirror 74, directly underlying the illuminated portion of the glass platen, shifts light projecting downward from the reflective scanning platform into the upper horizontal portion of the chassis towards the main portion of the optical pathway. Thus a document or photograph placed on top of the glass platen 46 is illuminated by the upper light bulb 82. The reflected light is then shifted through the optical pathway for remote viewing by the CCD. It will be appreciated by those skilled in the art that the position of the light source at an acute angle in relation to the position of the reflective scanning mirror minimizes any distortion caused by refraction of the light from the object scanned passing through the glass platen 46.

Movably positioned within the upper horizontal portion of the chassis is the optical switch 76. The optical switch 76 includes a moveable switch mirror 84 which maybe positioned in the upper horizontal portion of the chassis to face the main portion of the optical pathway to shift light from a transmissive branch segment 86 of the optical pathway towards the main portion of the optical pathway. When positioned to permit viewing of the transmissive scanning platform, light from the reflective branch segment is blocked by the switch mirror 84. The optical switch 76, rotatably coupled to the chassis, includes an axle 88 which extends width-wise across the chassis and projects through apertures 90 and 91 in side walls contained within the chassis. The axle includes a free end 92 which extends away from the chassis and bends at a right angle to extend downward into the cavity of the scanner housing. A frame 94, housing the switch mirror, is rigidly mounted to the axle along its lengthwise edge 96. The frame, positioned in spaced apart relation in between the opposing chassis side walls, includes a pair of spring loaded feed pistons 98 and 99 coupled between the chassis side wails and the lower ends 100 of the frame. The optical switch 76 is thus configured to toggle the switch mirror between a nearly horizontal position outside of the optical pathway for reflective scanning and a position within the optical pathway for transmissive scanning thereby changing the origin of the images viewed by the CCD.

Figure 6A:
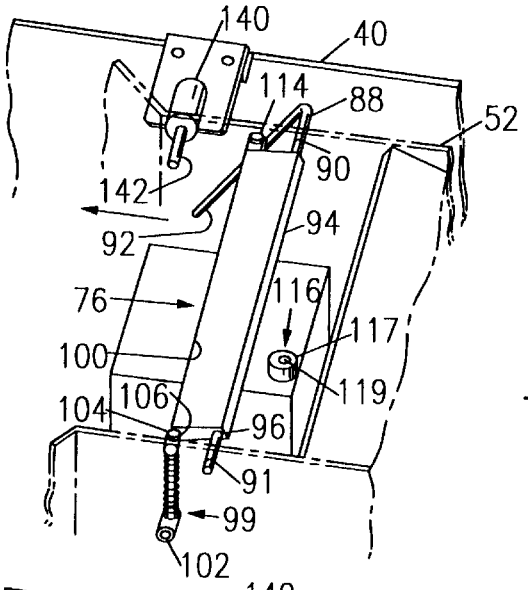
FIG. 6a is perspective partial view of a moving scanning camera of FIG. 3 showing an optical switch configured for scanning an opaque object.
Figure 6B:
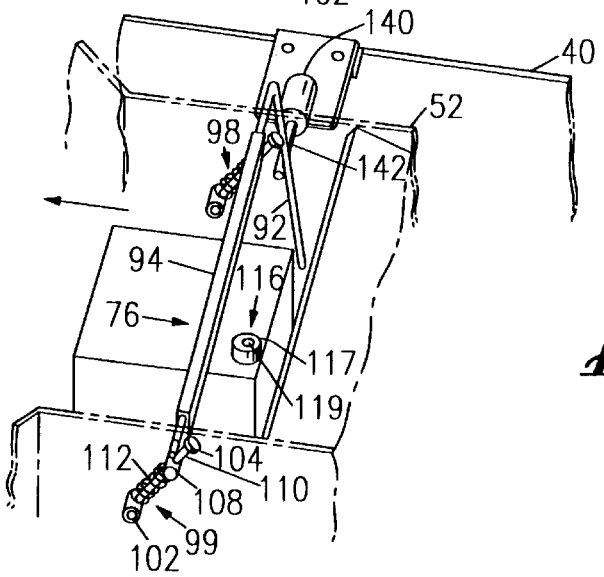
FIG. 6b is a perspective partial view of a moving scanning camera of FIG. 3 showing the optical switch transitioning between scanning modes.
Figure 6C:
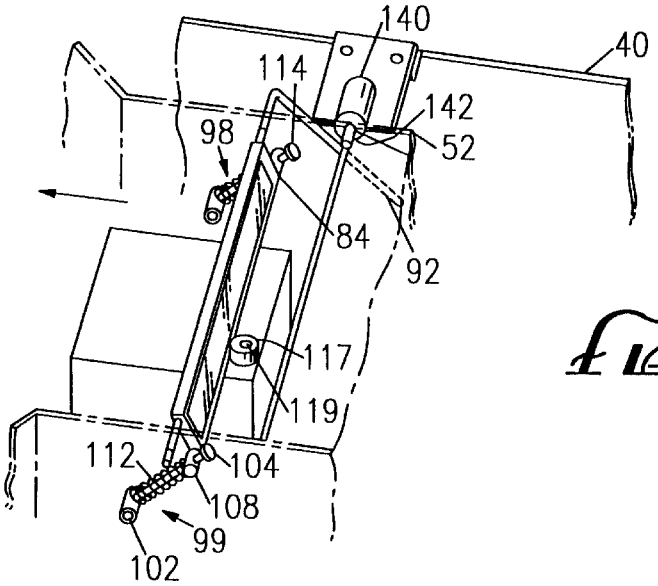
FIG. 6c is a perspective partial view of a moving scanning camera of FIG. 3 showing the optical switch configured for scanning a transparent object.
Figure 8:
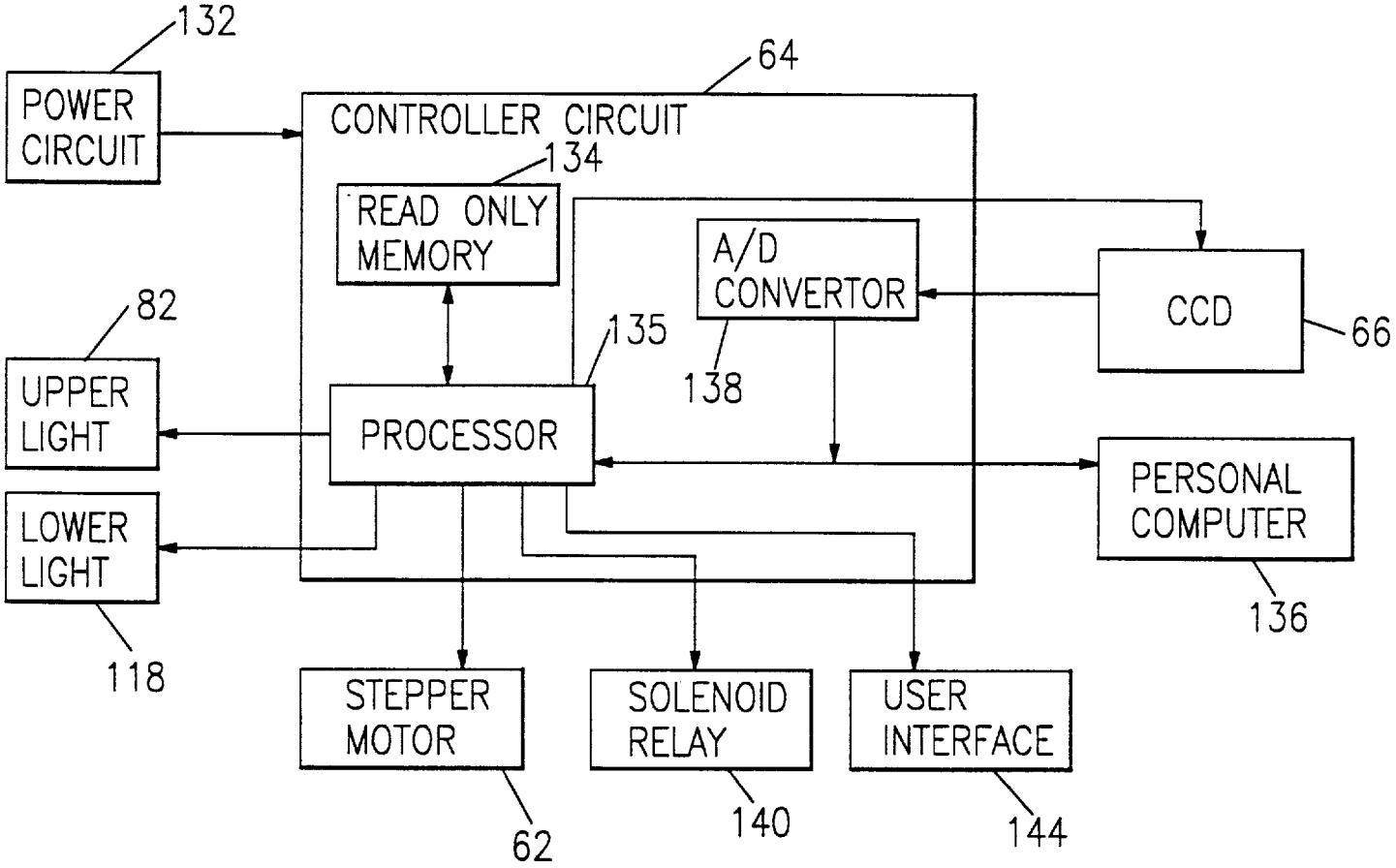
FIG. 8 is a block diagram of a controller circuit of the present invention.
Figure 9:
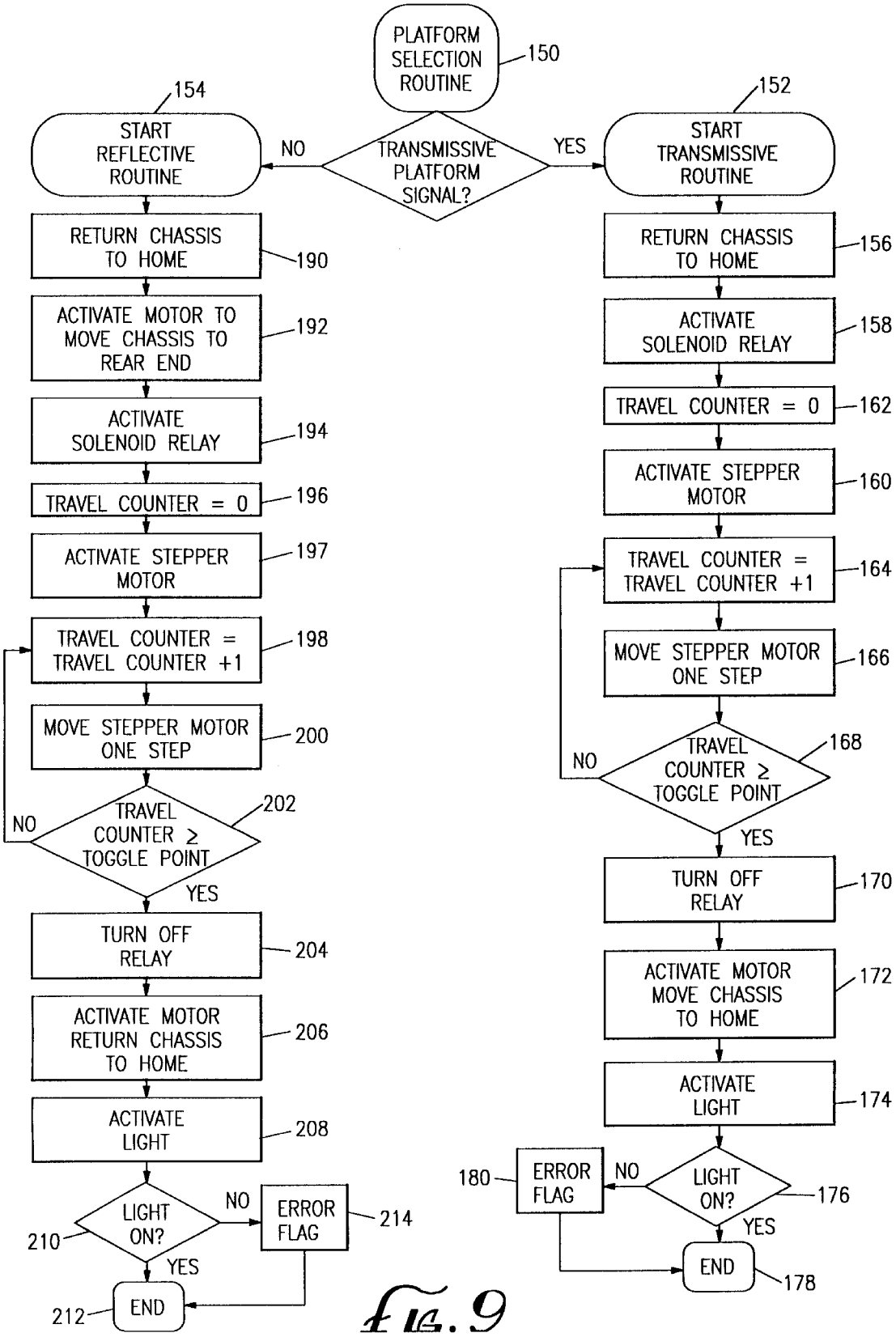
FIG. 9 is a flow diagram of a platform selection routine of the present invention.

The purpose of the feed pistons 98 and 99 is to prevent misalignment of the mirror 84 by providing sufficient force to bias the mirror at the respective reflective and transmissive positions. With reference to feed piston 98 of FIG. 6a–c, the feed pistons of the preferred embodiment include a piston rod 110 having a pivot pin 102 formed at its lower end that is rotatably coupled to the chassis side wall. A flat head stop 104 is formed at the upper fee end of the piston. Coupled to the lower end comer 106 of the frame, the lower end being radially distant from the axle, a second rotatable pivot pin 108 includes a collar 110 that is coupled about the shaft of the piston rod and moves telescopically along the shaft. A loaded coil spring 112 is mounted concentrically about the piston shaft between the piston lower end and the collar. The loaded coil spring 112 applies a force along the piston shaft and against the collar in the direction of the piston free end. This force is translated into a torque about the switch axle 88 thereby causing the lower end of the frame to rotate about the axle in the direction of the free end of the piston. It should be noted that when the piston free end is directed towards the axle, there is no angular momentum about the axle generated by the force of coil spring.

The angular displacement of the mirror during rotation about the axle is limited by stops 104, 114 and 116 which prevent further rotation of the mirror. A pair of reflective scanning stops 104 and 114, each located at the free end of the piston rods, stops the rearward clockwise rotation of the mirror at the nearly horizontal position for reflective scanning. A transmissive scanning stop 116, located on the upper surface of the lens and CCD housing, stops the forward counter-clockwise rotation of the mirror lower end to shift light from the transmissive branch segment towards the main portion of the optical pathway. The transmissive scanning stop 116 includes a plastic washer 112 mounted by a screw 119 to the lens housing. The mounting point and washer diameter are calculated to stop the switch mirror in precise alignment with the transmissive and main optical pathway. The feed pistons, mirror and stops cooperate to form an optical switch for toggling the scanning mode between reflective and transmissive scanning.

The transmissive branch segment includes a lower tubular florescent lamp 118 secured on a light fixture 120 underlying the chassis in spaced apart relation thereto. The light fixture and bulb extend width-wise under the chassis between a pair of mounting brackets 122–123 that secure the underlying fixture to the under side of the chassis. This lower light bulb 118 projects light up through the portion of transmissive scanning platform 45 directly overlying the light source. A transmissive scanning mirror 75, directly overlying the illuminated portion of the transmissive platform, shifts light from the transmissive scanning platform onto the switch mirror 84 which in turn shifts the light towards the main portion of the optical pathway. Thus, a slide or transparency placed on the transmissive scanning platform is illuminated by the lower light bulb 118. The transmitted light is then shifted through the optical pathway for remote viewing by the CCD. Because the light from the illuminated transmissive object entering the optical pathway is not obstructed by glass or other objects having an index of refraction which differs from the ambient air, it will be appreciated by those skilled in the art that distortion of the image due optical interference is minimized.

The transmissive platform 45 is removably positioned on a pair of docking tracks 128 and 129 which run lengthwise through the scanner housing in parallel with the rails. The docking tracks extend through a gap formed between the chassis and the lower light source. The transmissive scanning platform 45 is inserted through a docking port 44 on the front side of the scanner housing along the docking tracks. An optional hood 130 attached by a hinge to the front of the scanner may be lowered to cover the docking port 44 to eliminate any ambient light. The transmissive scanning platform 45 provides a secure holder for a transparency or slide. Such transmissive platforms come in a variety of configurations, each such platform configuration is tailored to the specific type transparent media to be scanned. Examples of transmissive platforms fit for this purpose are disclosed in U.S. Pat. application Ser. No. 08/228,736 incorporated herein by reference.

Contained within the housing are included a conventional power circuit 132 that connects to the controller circuit. The controller circuit 64 includes a Read Only Memory (ROM) for storing a scanner operation program that is operated by a processor 135 to conventionally control the light sources 82 and 118, drive motor 62 and CCD 66 and communicate with the personal computer (PC) 136. The control circuit also includes analog to digital (A/D) convertors connected to the CCD 66. The A/D convertors convert the analog signals into a digital form. Conventional digital signal processing techniques may then be applied to the scanned image data by the scanner CPU to enhance the image. The image data is then sent to the PC 136 for storage. The hardware configurations for these circuits may be of any conventionally available type presently used in conventional scanners and are largely dependent upon the type digital camera used.

Connected in circuit to an interrupt lead within the controller circuit is a solenoid relay 140. The solenoid relay 140, also known as a plunger relay, includes a moveable core 142 or plunger that extends out of one end of the solenoid relay in response solenoid action caused by an electrical current sent from the controller circuit 64 to the solenoid relay. When the controller circuit stops power to the solenoid relay, the moveable core 142 is drawn back into the solenoid 140. The moveable core of the solenoid relay is used to electronically toggle the optical switch 76. The free end 92 of the switch axle extends down into the scanner housing away from the chassis. When the chassis is drawn across the rails 49, the free end 92 of the axle travels through the scanner housing alongside the chassis. The solenoid 140 is mounted within the scanner housing, such that the movable core 142 when extended will intersect the free arm 92 of the axle. Thus, when the free arm of the axle engages the solenoid relay while the chassis is moving, the free arm will rotate the axle overcoming the force of the loaded spring causing the switch mirror to rotate. Upon the piston rods passing through the zero torque position. The direction of the torque reverses and the force provided by the feed pistons rotates the mirror until it engages the stops 104, 114 and 116. Operation of the solenoid 140 and control of the two light sources is accomplished by means of a platform selection subroutine included within the scanner software stored in the controller circuit ROM 134. A button included on the surface of the scanner or represented by a prompt within commercial software included with the personal computer provides a user interface 144 which allows the operator to activate the platform selection subroutine to select a desired scanning platform.

Before operation of the scanner as described above, the scanner is connected to a conventional power outlet and to a personal computer 136 having commercial scanning software capable of operating with the scanner. Bemuse the scanner includes two scanning platforms 42 and 45, the conventional scanning operation can only occur after selection of either the transmissive or reflective scanning platform. In the preferred embodiment, the selection of the scanning platform is made by the operator using the user interface 144, such as a button or switch located on the scanner or by means of a software setting added to the software within the personal computer. A selection signal is sent to the processor 135 of the controller circuit which in response activates the platform selection routine 150. The selection signal must be capable signaling the CPU at two signal levels. A first signal level indicating selection of the transmissive platform and a second level indicating selection of the reflective platform. The platform selection routine 152 includes a transmissive platform routine and a reflective platform routine 154.

The transmissive routine 152 activates the stepper motor to return the chassis to a home position along the rails proximate to the front end of the scanner 158. The solenoid relay is activated 158 to extend the core out into the path of the axle free end. The stepper motor 62 is then activated 160 to move the chassis along the rails 49 towards the back end. A travel counter is initialized 162 and tracks the movement of the chassis along the rails by counting 164 the incremental rotation 166 of the stepper motor drive shaft which is two hundred [(20)] (*200*) steps per rotation in the preferred embodiment. The chassis moves along the rails towards the rear of the scanner housing. If the optical switch is configured for reflective scanning the free end 92 of the axle will engage solenoid core 142. As the chassis moves towards the rear end of the scanner housing, the movement of free end of the axle engages the solenoid relay. By engaging the solenoid relay, the axle free end overcomes the biasing force of the loaded spring and rotates the mirror towards the transmissive scanning position. As the chassis continues to move along the rails 49, a toggle point is reached when the torque generated by the biasing force is reversed. After passing the toggle point, the feed pistons 98 and 99 push the free end of the mirror towards the transmissive platform stop 116. Upon the counter reaching a value indicating that the toggle point has been reached 168, the solenoid is turned off 170. The chassis continues to the rear end of the housing. Upon reaching the rear end of the scanner housing, the chassis then returns to the home position 172. The lower light source is then turned on 174. If the mirror is properly positioned and the light is working, light is transmitted through the transmissive branch segment 86 and shifted by the optical switch into the main pathway towards the lens and CCD. The control circuit then checks the CCD to ensure that the light is being received 176. If the light is received, the scanner can then begin conventional scanning from the transmissive scanner platform 178. Otherwise, an error message is generated 180 indicating that the light from the lower light source has not been received. It will be appreciated that if the mirror is already positioned for transmissive scanning, the free end of the axle will not contact the solenoid during the period that the solenoid is extended as the core is withdrawn upon passing the toggle point.

The reflective routine 154 also activates the stepper motor to return the chassis to a home position 190 along the rails proximate to the front end of the scanner. The stepper motor is then activated to move the chassis along the [mils] *rails* towards the rear end of the housing 192. Upon reaching the rear end of the scanner housing, the solenoid relay is activated 194 to extend the core out into the path of the axle free end. The travel counter is initialized 196 and the chassis then returns along the [mils] *rails* towards the home position. A counter tracks the movement of the chassis along the [mils] *rails* by counting the incremental rotation of the stepper motor drive shaft 198. The chassis moves along the [mils] *rails* towards the front of the scanner housing 200. If the optical switch is configured for transmissive scanning, the free end of the axle will contact solenoid core. As the chassis moves towards the front end of the scanner housing, the free end of the axle engages the solenoid relay. By engaging the solenoid relay, the axle free end over comes the biasing force of the loaded spring and rotates the mirror towards the reflective scanning position. As the chassis continues to move along the rails, a toggle point is reached when the torque generated by the biasing force is reversed. After passing the toggle point, the feed pistons push the free end of the mirror towards the reflective platform stops. Upon the counter reaching a value indicating that the toggle point has been reached 202, the solenoid is turned off 204. The chassis continues to the front end of the housing 206. The upper light source is then turned on 208. If the mirror is properly positioned out of the optical pathway and the light is working, light is transmitted through the reflective branch segment into the main pathway towards the lens and CCD. The control circuit then checks the CCD to ensure that the light is being received 210. If the light is received, the scanner can then begin conventional scanning from the reflective scanner platform 22. Otherwise, an error message is generated 214 indicating that the light from the upper light source has not been received.

Once the transmissive or reflective scanning platform has been selected, the scanner is ready to scan documents on that platform in a conventional manner. If the scanner is configured to shift light from the reflective scanner towards the lens and CCD, a document or photograph is placed on the glass platen. The lid is closed, the upper lamp is activated and the stepper motor incrementally draws the chassis under the glass platen. If the scanner is configured to shift light from the transmissive scanner towards the lens and CCD, a transparency or slide is placed on the transmissive platform. The transmissive platform is inserted into the docking port along the docking _track and the hood is closed. The lower lamp is activated and the stepper motor incrementally draws the chassis with lamp about the transmissive platform.

It will be appreciated by those skilled in the art that the optical switch disclosed herein may be accomplished by other devices such as a one way reflective mirror which would not require rotation of the mirror. In addition if fibre optic cable is substituted for the optical pathway other optical switches known in fibre optics maybe employed to switch between the two scanning platforms. Finally, a mechanical switch deployed on the outside of the scanner could also be substituted for the present electro-mechanical switch disclosed in the preferred embodiment.

It will be appreciated by those skilled in the [an] *art* that, when using a fixed focus lens, the length of the optical pathway must be the same when configured for transmissive scanning and when configured for reflective scanning.

It will be understood that certain features and sub-combinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. An optical scanning apparatus for retrieving digital images representative of opaque and transmissive objects comprising:

a scanner housing;

a reflective scanning platform formed in the upper surface of said scanner housing and including a glass platen upon which said opaque object is positioned;

a removable transmissive scanning platform;

a docking port formed in the side of said scanner and including docking tracks, said docking port receiving said removable transmissive scanning platform; and a scanning camera movably positioned proximate to said reflective scanning platform and including a digital camera, a lens, an optical pathway which are oriented to selectively view said platforms and generate electrical signals representative of the images viewed;

a motor means for moving said scanning camera along a lengthwise path within said housing;

a controller circuit which is connected to said scanning camera to activate said scanning camera such that upon activating said scanning camera receive said scanning camera electrical signals and which is connected to said motor means to control the movement of said scanning camera; and said digital camera being aligned with the lens to view images from the optical pathway and the optical pathway being selectively aligned with said reflective scanning platform in a reflective scanning mode such that said control circuit receives images representative of said opaque object and aligned with said transmissive scanning platform in a transmissive scanning mode such that said control circuit receives images representative of said transmissive object.

2. An optical scanning apparatus as set forth in claim 1 wherein said optical pathway further includes:

a reflective pathway branch optically aligned with said reflective scanning platform;

a transmissive pathway branch optically aligned with said transmissive scanning platform;

a main pathway aligned with said digital camera; and an optical switch which is connected in circuit with said controller circuit and pivotally secured within said scanning camera and in response to said controller circuit rotatable between a reflective scanning position out of optical alignment with said main pathway and a transmissive scanning position optically aligned with said main pathway.

3. An optical scanning apparatus as set forth in claim 1 wherein said optical switch further includes:

an axle rotatably connected to said scanning camera;

a switch mirror having a frame attached to said axle such that rotation of said axle pivotally changes the angular displacement of said switch mirror;

a transmissive stop connected to said scanning camera proximate to said switch mirror such that during said transmissive mode said mirror engages said stop; and at least one feed piston coupled between said mirror and scanning camera to bias said mirror against said transmissive stop.

4. An optical scanning apparatus as set forth in claim 3 wherein said optical switch further includes:

a relay connected in circuit to said controller circuit and in response to signals from said controller circuit extends a movable core;

said axle includes a free arm which extends away from said scanning camera, during movement of said scanning camera said core is extended within the path of the free arm such that said core engages said free arm to toggle transition between said transmissive mode and said reflective mode.

5. An optical scanning apparatus for retrieving digital electronic images representative of opaque and transmissive objects comprising:

a reflective scanning platform having a rectangular glass platen to overlie said opaque object thereon;

a transmissive scanning platform to support said transmissive object thereon;

at least one light source for illuminating said transmissive scanning platform;

a scanning camera movably positioned below said reflective scanning platform and including an opto-electrical transducer selectively aligned to view one of said scanning platforms; and wherein said scanning camera being aligned to view said transmissive scanning platform receives light directly transmitted from said transmissive object.

6. An optical scanning apparatus for retrieving digital images representative of opaque and transmissive objects comprising:

a scanner housing;

a reflective scanning platform formed in the upper surface of said scanner housing and including a glass platen upon which said opaque object is positioned;

a removable transmissive scanning platform;

a docking port formed in the side of said scanner and including docking tracks, Said docking port receiving said removable transmissive scanning platform; and a scanning camera movably positioned proximate to said reflective scanning platform and including a digital camera, a lens, an optical pathway which are oriented to selectively view said platforms and generate electrical signals representative of the images viewed;

a motor means for moving said scanning camera along a lengthwise path within said housing;

a controller circuit which is connected to said scanning camera to activate said scanning camera such that upon activating said scanning camera receive said scanning camera electrical signals and which is connected to said motor means to control the movement of said scanning camera;

said digital camera being aligned with the lens to view images from the optical pathway and the optical pathway being selectively aligned with said reflective scanning platform in a reflective scanning mode such that said control circuit receives images representative of said opaque object and aligned with said transmissive scanning platform in a transmissive scanning mode such that said control circuit receives images representative of said transmissive object;

an axle rotatably connected to said scanning camera;

a switch mirror having a frame attached to said axle such that rotation of said axle pivotally changes the angular displacement of said switch mirror;

a transmissive stop connected to said scanning camera proximate to said switch mirror such that during said transmissive mode said mirror engages said stop; and at least one feed piston coupled between said mirror and scanning camera to bias said mirror against said transmissive stop.

7. An optical scanning apparatus as set forth in claim 6 wherein said optical switch further includes:

a relay connected in circuit to said controller circuit and in response to signals from said controller circuit extends a movable core;

said axle includes a free arm which extends away from said scanning camera, during movement of said scanning camera said core is extended within the path of the free arm such that said core engages said free arm to toggle transition between said transmissive mode and said reflective mode.

8. A transmissive/reflective optical scanning apparatus comprising:

a scanner housing;

a reflective scanning platform;

a removable transmissive scanning platform;

a docking port formed in the side of said scanner, said docking port operatively formed to receive said removable transmissive scanning platform; and a scanning camera positioned proximate to said reflective scanning platform to selectively view said platforms and generate electrical signals representative of the images viewed.

9. A transmissive/reflective optical scanning apparatus as set forth in claim 8, said scanning camera including;

a digital camera;

a lens; and an optical pathway.

10. A transmissive/reflective optical scanning apparatus as set forth in claim 8 including:

a motor operatively connected to said scanning camera to move said scanning camera within said housing.

11. A transmissive/reflective optical scanning apparatus as set forth in claim 10 including:

a controller circuit connected to said scanning camera and operative to activate said scanning camera such that upon activating said scanning camera receive said scanning camera electrical signals and connected to said motor to control the movement of said scanning camera.

12. A transmissive/reflective optical scanning apparatus as set forth in claim 11, said controller circuit including:

a software program executed by said controller circuit to move said scanning camera in a predetermined path.

13. A transmissive/reflective optical scanning apparatus as set forth in claim 9, said optical pathway including:

an optical switch having a reflective scanning position and a transmissive scanning position.

14. A transmissive/reflective optical scanning apparatus as set forth in claim 9, said scanning camera including:

at least one light source.

15. A transmissive/reflective optical scanning apparatus as set forth in claim 8, said optical pathway including:

a reflective light source; and a transmissive light source.

*16. An optical scanning apparatus for retrieving digital images representative of opaque and transmissive objects comprising:*

*a scanner housing;*

*a reflective scanning platform formed in the upper surface of said scanner housing and including a glass platen upon which said opaque object is positioned;*

*a removable transmissive scanning platform;*

*a docking port formed in the side of said scanner, said docking port receiving said removable transmissive scanning platform;*

*a scanning camera movably positioned relative to said reflective scanning platform and including a digital camera, a lens and an optical pathway which are oriented to selectively view said platforms and generate electrical signals representative of the images viewed;*

*a motor adapted to move said scanning camera along a lengthwise path within said housing;*

*a controller circuit which is connected to said scanning camera, adapted to activate said scanning camera, such that upon activating said scanning camera, receive said scanning camera electrical signals, said circuit also connected to said motor and adapted to control the movement of said scanning camera through operation of said motor; and*

*said digital camera being aligned with the lens to view images from the optical pathway and the optical pathway being selectively aligned with said reflective scanning platform in a reflective scanning mode such that said control circuit receives images representative of said opaque object and aligned with said transmissive*

*scanning mode such that said control circuit receives images representative of said transmissive object.*

*17. An optical scanning apparatus for retrieving digital electronic images representative of opaque and transmissive objects comprising:*

*a reflective scanning platform having a rectangular glass platen to overlie said opaque object thereon;*

*a transmissive scanning platform adapted to remain stationary during transmissive scanning and to support said transmissive object thereon; and*

*a scanning camera movably positioned below said reflective scanning platform and including a digital camera aligned to view either said reflective scanning platform or said transmissive scanning platform.*

*18. A transmissive/reflective optical scanning apparatus comprising:*

*a scanner housing;*

*a reflective scanning platform;*

*a removable transmissive scanning platform adapted to remain stationary during transmissive scanning;*

*a docking port formed in the side of said scanner, said docking port operatively formed to receive said removable transmissive scanning platform; and*

*a scanning camera positioned under said reflective scanning platform and adapted to view either of said platforms and generate electrical signals representative of the images viewed.*

*19. A transmissive/reflective optical scanning apparatus as set forth in claim 18, said scanning camera including;*

*a digital camera;*

*a lens; and*

*an optical pathway.*

*20. A transmissive/reflective optical scanning apparatus as set forth in claim 18 including;*

*a motor operatively connected to said scanning camera to move said scanning camera within said housing.*

*21. A transmissive/reflective optical scanning apparatus as set forth in claim 20 including:*

*a controller circuit connected to said scanning camera and operative to activate said scanning camera such that upon activating said scanning camera, receive said scanning camera electrical signals, and said circuit connected to said motor and operative to control the movement of said scanning camera.*

*22. A transmissive/reflective optical scanning apparatus as set forth in claim 21 said controller circuit including:*

*a software program executable by said controller circuit to move said scanning camera in a predetermined path.*

*23. A transmissive/reflective optical scanning apparatus as set forth in claim 19 said optical pathway further including:*

*an optical switch having a reflective scanning position and a transmissive scanning position.*

*24. A transmissive/reflective optical scanning apparatus as set forth in claim 19, said scanning camera further including:*

*at least one light source.*

*25. A transmissive/reflective optical scanning apparatus as set forth in claim 19 said optical pathway further including;*

*at least three mirrors.*

* * * * *